United States Patent
Teranishi et al.

(10) Patent No.: US 11,339,261 B2
(45) Date of Patent: May 24, 2022

(54) PREPREG AND FIBER-REINFORCED COMPOSITE MATERIAL

(71) Applicant: Mitsubishi Chemical Corporation, Chiyoda-ku (JP)

(72) Inventors: Takuya Teranishi, Chiyoda-ku (JP); Satoshi Okamoto, Chiyoda-ku (JP); Akira Oota, Chiyoda-ku (JP); Masahiro Ichino, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/925,408

(22) Filed: Jul. 10, 2020

(65) Prior Publication Data
US 2021/0009776 A1    Jan. 14, 2021

Related U.S. Application Data

(63) Continuation of application No. PCT/JP2019/000709, filed on Jan. 11, 2019.

(30) Foreign Application Priority Data

Jan. 16, 2018 (JP) ............................ JP2018-005147

(51) Int. Cl.
*C08J 5/24* (2006.01)
*C08L 63/04* (2006.01)

(52) U.S. Cl.
CPC ................. *C08J 5/24* (2013.01); *C08L 63/04* (2013.01); *C08J 2363/00* (2013.01); *C08J 2463/00* (2013.01)

(58) Field of Classification Search
CPC ...... C08J 5/24; C08J 2363/00; C08J 2463/00; C08L 63/04
(Continued)

(56) References Cited

U.S. PATENT DOCUMENTS 5,589,523 A      12/1996  Sawaoka et al.
6,670,006 B1 *  12/2003  Sugimori ............. C08G 59/226
                                                                    428/36.9

(Continued)

FOREIGN PATENT DOCUMENTS

CN       1374189 A      10/2002
CN     101910230 A      12/2010
(Continued)

OTHER PUBLICATIONS

International Search Report dated Apr. 16, 2019 in PCT/JP2019/000709, 2 pages.
(Continued)

*Primary Examiner* — David T Karst
(74) *Attorney, Agent, or Firm* — Oblon, McClelland, Maier & Neustadt, L.L.P.

(57) ABSTRACT

A prepreg contains: a reinforcing fiber material; and a resin composition with which the reinforcing fiber material is impregnated. The resin composition contains an epoxy resin, an amine curing agent, and an imidazole curing agent. An amount of the amine curing agent is less than or equal to 3.8 parts by mass, relative to 100 parts by mass of the epoxy resin, and a sum of the amount of the amine curing agent and an amount of the imidazole curing agent is less than or equal to 10 parts by mass, relative to 100 parts by mass of the epoxy resin. The fiber-reinforced composite material is a cured product of the prepreg.

19 Claims, 2 Drawing Sheets

(58) Field of Classification Search
USPC ........................................................ 523/222
See application file for complete search history.

(56) References Cited

U.S. PATENT DOCUMENTS

| | | |
|---|---|---|
| 2002/0168475 A1 | 11/2002 | Yamaji et al. |
| 2006/0035088 A1 | 2/2006 | Takano et al. |
| 2008/0185753 A1 | 8/2008 | Takano et al. |
| 2008/0185757 A1 | 8/2008 | Takano et al. |
| 2008/0187718 A1 | 8/2008 | Takano et al. |
| 2009/0202832 A1 | 8/2009 | Takano et al. |
| 2010/0240816 A1 | 9/2010 | Liao et al. |
| 2012/0202071 A1* | 8/2012 | Kaneko .................. B29C 65/02 428/413 |
| 2012/0251823 A1* | 10/2012 | Maldonado ........... B29B 15/122 428/367 |
| 2015/0162110 A1* | 6/2015 | Li ............................ H01B 3/40 428/375 |
| 2018/0142057 A1 | 5/2018 | Oota et al. |
| 2018/0244879 A1 | 8/2018 | Takehara et al. |
| 2020/0032047 A1 | 1/2020 | Ota et al. |
| 2020/0055978 A1 | 2/2020 | Oota et al. |
| 2020/0255614 A1 | 8/2020 | Teranishi et al. |

FOREIGN PATENT DOCUMENTS

| | | | |
|---|---|---|---|
| CN | 107406599 A | | 11/2017 |
| EP | 3 296 359 A1 | | 3/2018 |
| EP | 3 611 210 A1 | | 2/2020 |
| EP | 3 712 192 A1 | | 9/2020 |
| JP | 7-304968 A | | 11/1995 |
| JP | 2000-169605 A | | 6/2000 |
| JP | 2006-104403 A | | 4/2006 |
| JP | 2009-83128 A | | 4/2009 |
| JP | 2011-500950 A | | 1/2011 |
| JP | 2015-67729 A | | 4/2015 |
| JP | 2015-93982 A | | 5/2015 |
| JP | 2016-169314 A | | 9/2016 |
| JP | 2017-39842 A | | 2/2017 |
| JP | 2017-101227 A | | 6/2017 |
| WO | WO 2004/048435 A1 | | 6/2004 |
| WO | WO 2009/055666 A1 | | 4/2009 |
| WO | WO 2016/182077 A1 | | 11/2016 |
| WO | WO 2018/190329 A1 | | 10/2018 |

OTHER PUBLICATIONS

International Preliminary Report on Patentability dated Jul. 21, 2020 in PCT/JP2019/000709 filed Jan. 11, 2019, 9 pages.
Japanese Office Action dated May 26, 2020 in Patent Application No. 2019-505538 (with English translation), 5 pages.
Japanese Office Action dated Dec. 24, 2019 in Patent Application No. 2019-505538 (with English translation), 12 pages.
Combined Taiwanese Office Action and Search Report dated Aug. 10, 2020 in Patent Application No. 108101111 (with English translation), 23 pages.
Extended European Search Report dated Feb. 5, 2021 in European Patent Application No. 19741380.0, 8 pages.

* cited by examiner

PREPREG AND FIBER-REINFORCED COMPOSITE MATERIAL

TECHNICAL FIELD

The present invention relates to a prepreg and a fiber-reinforced composite material. The present application claims priority on Japanese Patent Application, Tokugan, No. 2018-005147 filed on Jan. 16, 2018, the contents of the specification of which are hereby incorporated by reference.

BACKGROUND ART

Fiber-reinforced composite materials containing reinforcing fibers and matrix resin compositions are widely used in various industries such as the automobile industry, due to, for example, excellent mechanical properties. The applications of the fiber-reinforced composite materials are increasing in recent years. A known example of such a fiber-reinforced composite material is a fiber-reinforced composite material which is molded by subjecting, to heating and pressurization, a prepreg in the form of a plurality of sheets in which reinforcing fibers are impregnated with resin compositions.

In many cases, matrix resin compositions having excellent impregnating ability and excellent heat resistance are used. Examples of such matrix resin compositions encompass thermosetting resin compositions containing, for example, phenol resin, melamine resin, bismaleimide resin, unsaturated polyester resin, or epoxy resin. Among these thermosetting resin compositions, an epoxy resin composition is widely used due to its excellent heat resistance and excellent moldability and due to the fact that a fiber-reinforced composite material having higher mechanical strength can be obtained from the epoxy resin composition.

As a method of molding a fiber-reinforced composite material which is widely used for automobiles, high-cycle press molding is known (see, for example, Patent Literature 1). In high-cycle press molding, a resin composition is cured at high pressure, at approximately 100° C. to 150° C., and in such a short period of time as approximately several minutes to several tens of minutes in order to be able to produce a large amount of products. The resin composition used in high-cycle press molding is required to (i) be fast curable to be able to be cured at approximately 100° C. to 150° C. and in such a short period of time as approximately several minutes to several tens of minutes and (ii) cause a resultant fiber-reinforced composite material to have mechanical properties.

In addition, in high-cycle press molding, a (preforming) technique is known in which a reinforcing fiber is preformed in advance so as to have a shape into which the fiber is to be molded (see, for example, Patent Literature 2). According to the preforming technique, in general, a fabric (cloth) is used as a reinforcing fiber more than a unidirectional material such as a fiber, because the fabric has good preforming properties. According to the preforming technique, for example, a prepreg in which layers are laminated so as to have a certain thickness is preformed.

CITATION LIST

Patent Literature

[Patent Literature 1]
International Publication No. WO 2004/48435 (Publication Date: Mar. 23, 2006)

[Patent Literature 2]
Japanese Patent Application Publication Tokukai No. 2009-83128 (Publication date: Apr. 23, 2009)

SUMMARY OF INVENTION

Technical Problem

However, according to conventional high-cycle press molding, if fast curability is achieved by increasing the amount of curing agent in a resin composition or by using an epoxy resin having a small epoxy equivalent, a resin cured product (matrix resin composition) tends to be fragile. Thus, the conventional high-cycle press molding still has room for improvement in terms of simultaneously achieving both fast curability and good mechanical properties.

In addition, according to the conventional preforming technique, there are cases where cloth having a large weight per unit area is used to decrease the number of layers in a prepreg for increasing operation efficiency. However, a large weight per unit area of the cloth may lead to an increase in rigidity of the prepreg, and may therefore make it difficult to preform the prepreg. Thus, the conventional preforming technique still has room for improvement in terms of simultaneously achieving both (i) an increase in operation efficiency by using cloth having a large weight per unit area and (ii) preforming properties of the prepreg.

A first object of an aspect of the present invention is to provide a prepreg which is not only fast curable but also excellent in preforming properties even with use of cloth having a large weight per unit area. A second object of the aspect of the present invention is to provide a fiber-reinforced composite material having good mechanical properties.

Solution to Problem

In order to attain the object, a prepreg in accordance with an aspect of the present invention contains: a reinforcing fiber material; and a resin composition with which the reinforcing fiber material is impregnated. The resin composition contains an epoxy resin, an amine curing agent, and an imidazole curing agent. An amount of the amine curing agent is less than or equal to 3.8 parts by mass, relative to 100 parts by mass of the epoxy resin. A sum of the amount of the amine curing agent and an amount of the imidazole curing agent is less than or equal to 10 parts by mass, relative to 100 parts by mass of the epoxy resin.

A fiber-reinforced composite material in accordance with an aspect of the present invention is a cured product of the prepreg.

Advantageous Effects of Invention

With an aspect of the present invention, it is possible to provide a prepreg which is not only fast curable but also excellent in preforming properties even with use of cloth having a large weight per unit area. In addition, with an aspect of the present invention, it is possible to provide a fiber-reinforced composite material having good mechanical properties.

DESCRIPTION OF EMBODIMENTS

Figure 1:
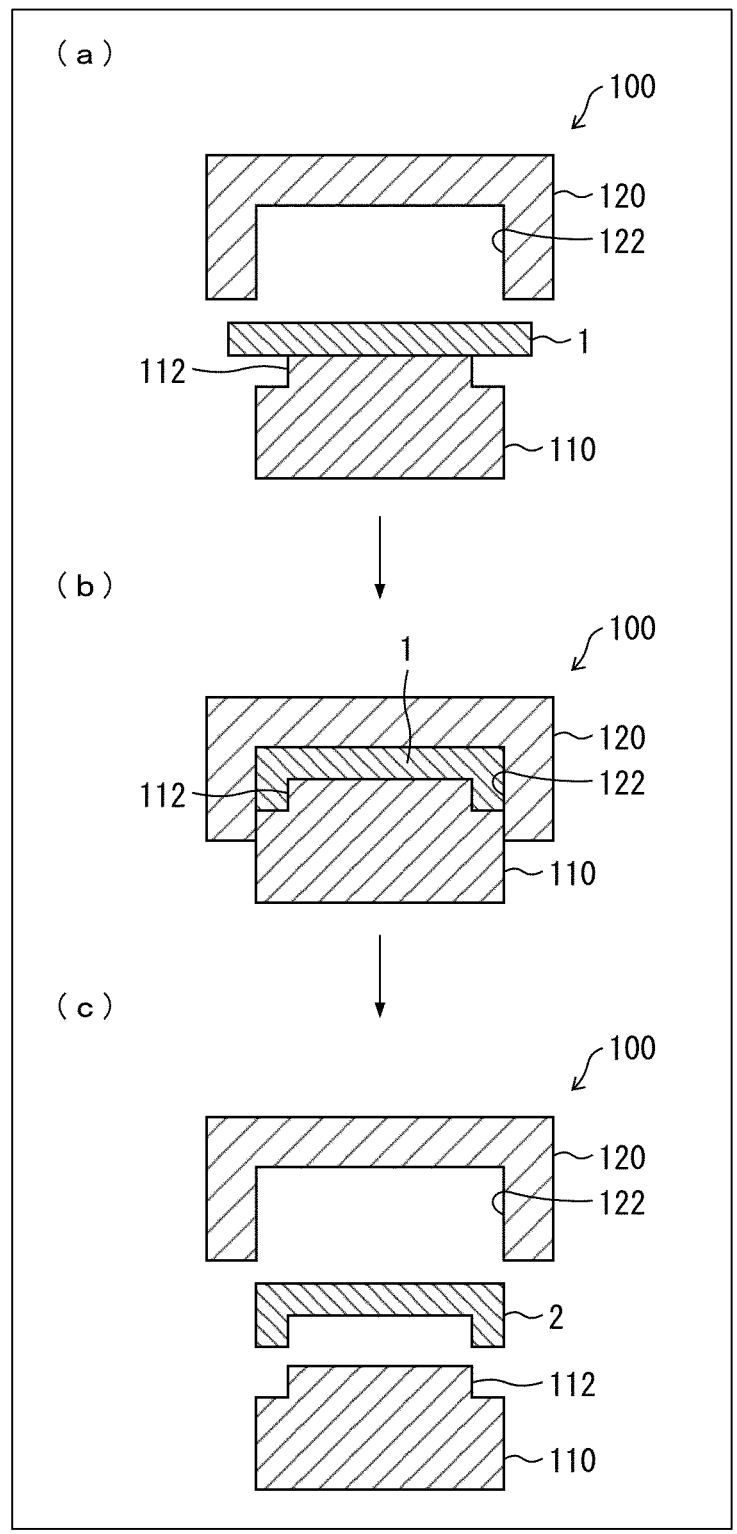
FIG. 1 is a set of views (a) to (c), (a) of FIG. 1 being a view schematically illustrating a prepreg before preforming in accordance with an embodiment of the present invention, (b) of FIG. 1 being a view schematically illustrating the prepreg during preforming and curing, and (c) of FIG. 1 being a view schematically illustrating the prepreg after the curing.

The following description will discuss a preferable embodiment of the present invention. However, the present invention is not limited to the embodiment.

<Resin Composition>

A resin composition for use in a prepreg of the present invention contains an epoxy resin, an amine curing agent, and an imidazole curing agent.

[Epoxy Resin]

The epoxy resin contained in the resin composition for use in the prepreg of the present invention is, for example, a polymer compound having an epoxy group in a molecule. The epoxy resin can be of a single kind or can be of two or more kinds. For improving heat resistance and mechanical properties of a cured product (resin cured product) of the resin composition, the epoxy resin preferably has two or more epoxy groups in a molecule.

The epoxy resin preferably contains an epoxy resin having an oxazolidone ring in a molecule. Specific examples of the epoxy resin having an oxazolidone ring in a molecule encompass a compound in which an oxazolidone ring is generated by an isocyanate compound and an epoxy resin with each other. In addition, examples of a commercial product of the epoxy resin having an oxazolidone ring in a molecule encompass AER4152, AER4151, LSA4311, LSA4313, LSA7001 (each of which is manufactured by Asahi Kasei Corporation), EPOTOHTO YD-952 (manufactured by Nippon Steel & Sumikin Chemical Co., Ltd.; "EPOTOHTO" is a registered trademark of Nippon Steel & Sumikin Chemical Co., Ltd.), and EPICLON TSR-400 (manufactured by DIC Corporation; "EPICLON" is a registered trademark of DIC Corporation).

The epoxy resin having an oxazolidone ring in a molecule is preferably contained in an amount of more than or equal to 25 parts by mass, relative to 100 parts by mass of the epoxy resin. Such an amount of the epoxy resin having an oxazolidone ring in a molecule as more than or equal to 25 parts by mass makes it possible to achieve good mechanical properties of the resin cured product. For achieving such good mechanical characteristics, the amount of the epoxy resin having an oxazolidone ring in a molecule is preferably more than or equal to 30 parts by mass, more preferably more than or equal to 32 parts by mass, and still more preferably more than or equal to 35 parts by mass. The amount of the epoxy resin having an oxazolidone ring in a molecule is not limited, provided that a desired effect of improving mechanical properties is obtained. For example, the amount can be less than or equal to 70 parts by mass. The amount of the epoxy resin having an oxazolidone ring in a molecule can be confirmed with use of, for example, known instrumental analysis.

Provided that the effect of the present embodiment can be obtained, the epoxy resin can further contain another epoxy resin other than the epoxy resin having an oxazolidone ring in a molecule. Examples of such another epoxy resin encompass: a glycidyl ether type epoxy resin obtained from (i) a compound having a hydroxyl group in a molecule and (ii) epichlorohydrin; a glycidylamine type epoxy resin obtained from (i) a compound having an amino group in a molecule and (ii) epichlorohydrin; a glycidyl ester type epoxy resin obtained from (i) a compound having a carboxyl group in a molecule and (ii) epichlorohydrin; an alicyclic epoxy resin obtained by oxidizing a compound having a double bond in a molecule; an epoxy resin having a heterocyclic structure; and an epoxy resin in which two or more structures selected from an amino group, a carboxyl group, a double bond, and a heterocyclic structure are mixed in a molecule.

(Glycidyl Ether Type Epoxy Resin)

Specific examples of the glycidyl ether type epoxy resin encompass: aryl glycidyl ether type epoxy resins such as a bisphenol A epoxy resin, a bisphenol F epoxy resin, a bisphenol S epoxy resin, a resorcinol type epoxy resin, a phenol novolac type epoxy resin, a trisphenol novolac type epoxy resin, a naphthalene type epoxy resin, and an anthracene type epoxy resin; a polyethylene glycol type epoxy resin; a polypropylene glycol type epoxy resin; dicyclopentadiene type epoxy resin; position isomers of these resins; and substituents of these resins, each of which substituents has an alkyl group or a halogen as a substituent group.

Examples of a commercial product of the bisphenol A epoxy resin encompass EPON825, jER826, jER827, jER828 (each of which is manufactured by Mitsubishi Chemical Corporation; "jER" is a registered trademark of Mitsubishi Chemical Corporation), EPICLON850 (manufactured by DIC Corporation; "EPICLON" is a registered trademark of DIC Corporation), EPOTOHTO YD-128 (manufactured by Nippon Steel & Sumikin Chemical Co., Ltd.; "EPOTOHTO" is a registered trademark of Nippon Steel & Sumikin Chemical Co., Ltd.), DER-331, DER-332 (each of which is manufactured by Dow Chemical Japan Ltd.), Bakelite EPR154, Bakelite EPR162, Bakelite EPR172, Bakelite EPR173, and Bakelite EPR174 (each of which is manufactured by Bakelite AG).

Examples of a commercial product of the bisphenol F epoxy resin encompass jER806, jER807, jER1750, (each of which is manufactured by Mitsubishi Chemical Corporation), EPICLON830 (manufactured by DIC Corporation), EPOTOHTO YD-170 EPOTOHTO YD-175 (each of which is manufactured by Nippon Steel & Sumikin Chemical Co., Ltd.), Bakelite EPR169 (manufactured by Bakelite AG), GY281, GY282, and GY285 (each of which is manufactured by Huntsman Advanced Materials).

Examples of a commercial product of the bisphenol S epoxy resin encompass EPICLON EXA-1514 (manufactured by DIC Corporation).

Examples of a commercial product of the resorcinol type epoxy resin encompass DENACOL EX-201 (manufactured by Nagase ChemteX Corporation; "DENACOL" is a registered trademark of Nagase ChemteX Corporation).

Examples of a commercial product of the phenol novolac type epoxy resin encompass jER152, jER154 (each of which is manufactured by Mitsubishi Chemical Corporation), EPICLON N-740 (manufactured by DIC Corporation), EPN179, and EPN180 (each of which is manufactured by Huntsman Advanced Materials).

Examples of a commercial product of the trisphenolmethane type epoxy resin encompass Tactix742 (manufactured by Huntsman Advanced Materials; "Tactix" is a registered trademark of Huntsman Advanced Materials), EPPN501H, EPPN501HY, EPPN502H, EPPN503H (each of which is manufactured by Nippon Kayaku Co., Ltd.; "EPPN" is a registered trademark of Nippon Kayaku Co., Ltd.), and jER1032H60 (manufactured by Mitsubishi Chemical Corporation).

Examples of a commercial product of the naphthalene type epoxy resin encompass HP-4032, HP-4700 (each of which is manufactured DIC Corporation), and NC-7300 (manufactured by Nippon Kayaku Co., Ltd.).

Examples of a commercial product of the dicyclopentadiene type epoxy resin encompass XD-100 (manufactured by Nippon Kayaku Co., Ltd.) and HP7200 (manufactured by DIC Corporation).

Examples of a commercial product of the anthracene type epoxy resin encompass YL7172 and YX8800 (each of which is manufactured by Mitsubishi Chemical Corporation).

(Glycidylamine Type Epoxy Resin)

Specific examples of the glycidylamine type epoxy resin encompass tetraglycidyldiaminodiphenylmethanes, a glycidyl compound of aminophenol, a glycidyl compound of aminocresol, glycidyl anilines, and a glycidyl compound of xylenediamine.

Examples of a commercial product of the tetraglycidyldiaminodiphenylmethanes encompass SUMI-EPOXY ELM434 (manufactured by Sumitomo Chemical Co., Ltd.; "SUMI-EPOXY" is a registered trademark of Sumitomo Chemical Co., Ltd.), Araldite MY720, Araldite MY721, Araldite MY9512, Araldite MY9612, Araldite MY9634, Araldite MY9663 (each of which is manufactured by Huntsman Advanced Materials; "Araldite" is a registered trademark of Huntsman Advanced Materials), jER604 (manufactured by Mitsubishi Chemical Corporation), Bakelite EPR494, Bakelite EPR495, Bakelite EPR496, and Bakelite EPR497 (each of which is manufactured by Bakelite AG).

Examples of a commercial product of the glycidyl compound of aminophenol and the glycidyl compound of aminocresol encompass jER630 (manufactured by Mitsubishi Chemical Corporation), Araldite MY0500, Araldite MY0510, Araldite MY0600 (each of which is manufactured by Huntsman Advanced Materials), SUMI-EPOXY ELM 120, and SUMI-EPOXY ELM100 (each of which is manufactured by Sumitomo Chemical Co., Ltd.).

Examples of a commercial product of the glycidyl anilines encompass GAN, GOT (each of which is manufactured by Nippon Kayaku Co., Ltd.; "GAN" and "GOT" are registered trademarks of Nippon Kayaku Co., Ltd.) and Bakelite EPR493 (manufactured by Bakelite AG).

Examples of the glycidyl compound of xylenediamine encompass TETRAD-X (manufactured by Mitsubishi Gas Chemical Company, Inc.; "TETRAD" is a registered trademark of Mitsubishi Gas Chemical Company, Inc.).

(Glycidyl Ester Type Epoxy Resin)

Specific examples of the glycidyl ester type epoxy resin encompass phthalic acid diglycidyl ester, hexahydrophthalic acid diglycidyl ester, isophthalic acid diglycidyl ester, dimer acid diglycidyl ester, and isomers of these resins.

Examples of a commercial product of the phthalic acid diglycidyl ester encompass Epomic R508 (manufactured by Mitsui Chemicals, Inc.; "Epomic" is a registered trademark of Mitsui Chemicals, Inc.) and DENACOL EX-721 (manufactured by Nagase ChemteX Corporation).

Examples of a commercial product of the hexahydrophthalic acid diglycidyl ester encompass Epomic R540 (manufactured by Mitsui Chemicals, Inc.) and AK-601 (manufactured by Nippon Kayaku Co., Ltd.).

Examples of a commercial product of the dimer acid diglycidyl ester encompass jER871 (manufactured by Mitsubishi Chemical Corporation) and EPOTOHTO YD-171 (manufactured by Nippon Steel & Sumikin Chemical Co., Ltd.).

(Alicyclic Epoxy Resin)

Specific examples of the alicyclic epoxy resin encompass a polymer compound having a 1,2-epoxycyclohexane ring as a partial structure.

Examples of a commercial product of the compound having a 1,2-epoxycyclohexane ring as a partial structure encompass CELLOXIDE2021P, CELLOXIDE2081, CELLOXIDE3000 (each of which is manufactured by Daicel Corporation; "CELLOXIDE" is a registered trademark of Daicel Corporation), and CY179 (manufactured by Huntsman Advanced Materials).

The epoxy equivalent of the epoxy resin is preferably more than or equal to 200 g/eq. An epoxy equivalent of more than or equal to 200 g/eq causes the number of epoxy groups contained in the resin to be appropriate, and causes a distance between the epoxy groups to be appropriate. This prevents a heat-resistance of the epoxy resin during curing reaction of the resin composition from being excessively high in comparison with a curing temperature. If the heat-resistance of the epoxy resin is not excessively high in comparison with the curing temperature, epoxy resin molecules can easily move, and therefore makes it possible to maintain reactivity. This makes it possible to maintain a reaction rate of unreacted epoxy groups in the epoxy resin. Consequently, the reaction convergence of the resin composition becomes fast, and fast curability therefore improves.

In view of fast curability, the epoxy equivalent is more preferably more than or equal to 210 g/eq, and still more preferably more than or equal to 215 g/eq. The epoxy equivalent is not limited, provided that desired fast curability can be obtained. For example, the epoxy equivalent can be less than or equal to 500 g/eq. The epoxy equivalent can be confirmed with use of, for example, known instrumental analysis.

[Amine Curing Agent]

The amine curing agent in the present embodiment can be selected as appropriate from compounds which promote curing of the epoxy resin. The amine curing agent can be of a single kind or can be of two or more kinds.

Examples of the amine curing agent encompass: aromatic amines such as diaminodiphenylmethane and diaminodiphenyl sulfone; aliphatic amine; dicyandiamide; tetramethylguanidine; thiourea adduct amine; and derivatives, isomers, and modified products of these amine curing agents. For increasing storage stability, the amine curing agent is preferably a crystalline solid at room temperature (25° C.).

For efficiently curing the epoxy resin, the volume average particle size of the amine curing agent is preferably less than or equal to 20 µm, more preferably less than or equal to 10 µm, and still more preferably less than or equal to 5 µm. An amine curing agent having a volume average particle size of less than or equal to 20 µm is preferable because such an amine curing agent is dispersed well in the resin composition, so as to promote a curing reaction. Note that the volume average particle size of the amine curing agent can be obtained by (i) measuring a particle size distribution with use of a granulometer (manufactured by Nikkiso Co., Ltd.; product name: AEROTRAC SPR; Model: 7340, or manufactured by MicrotracBEL Corp.; product name: AEROTRAC LDSA-3500A; "AEROTRAC" is a registered trademark of MicrotracBEL Corp.) and (ii) converting the measured particle size distribution into a D50 value.

The amine curing agent is preferably dicyandiamide or a derivative of dicyandiamide because these amine curing agents allow the resin composition to have excellent storage stability and allow the resin cured product to have good mechanical properties.

Examples of the derivative of dicyandiamide encompass compounds obtained by binding dicyandiamide to any of various compounds such as an epoxy resin, a vinyl compound, an acrylic compound, and a 9,10-dihydro-9-oxa-10-phosphorphenanthrene-10-oxide.

The derivative of dicyandiamide can be of a single kind, can be of two or more kinds, or can be used in combination with dicyandiamide.

The derivative of dicyandiamide or of dicyandiamide is preferably dicyandiamide because of its reactivity with an epoxy resin.

In addition, dicyandiamide or the derivative thereof can be a commercial product. Examples of a commercial product of dicyandiamide encompass DICY7, DICY15 (each of which is manufactured by Mitsubishi Chemical Corporation), and Dicyanex 1400F (manufactured by Air Products).

[Imidazole Curing Agent]

The imidazole curing agent in accordance with the present embodiment is a compound having an imidazole ring in a molecule. The imidazole curing agent can be of a single kind or can be of two or more kinds. For example, the imidazole curing agent is a compound having an imidazole ring in a molecule, and is at least one selected from the group consisting of: a compound (imidazole derivative) having a substituent group in an imidazole ring; a compound (imidazole adduct) having a structure formed by ring-opening addition of an imidazole or an imidazole derivative to an epoxy group of an epoxy resin; a compound clathrateimidazole) in which imidazole is subjected to clathration treatment with heterodimers; a microencapsulated imidazole or a microencapsulated imidazole derivative (microencapsulated imidazole); and an imidazole or an imidazole derivative (imidazole adduct) in each of which a stabilizer or the like is coordinated.

A curing starting temperature at which the imidazole compound starts to be cured is preferably more than or equal to 100° C. in view of storage stability of the resin composition and of a prepreg (described later) containing the resin composition. An imidazole compound having a curing starting temperature of more than or equal to 100° C. has low reactivity at a relatively low temperature such as room temperature. In addition, the resin composition containing an imidazole compound having a curing starting temperature of more than or equal to 100° C. has high thermal stability. This causes storage stability of the resin composition and of the prepreg to be high. Meanwhile, the curing starting temperature is more preferably more than or equal to 110° C. for achieving good curability and good curing promoting property at a temperature at which the prepreg is to be subjected to a molding process.

Note that the curing starting temperature is measured by the following method. First, 10 parts by mass of an imidazole compound is added to and mixed with 100 parts by mass of a bisphenol A epoxy resin having an epoxy equivalent of 180 to 220, so that a sample resin composition is prepared. The amount of heat generated by the sample resin composition is measured with use of a differential scanning calorimeter (DSC; e.g. Q1000 manufactured by TA Instruments) at a heating rate of 10° C./min. A temperature of an intersection of a tangent at an inflection point of a DSC curve obtained and a baseline is considered as the curing starting temperature of the imidazole compound.

Examples of the imidazole compound having a curing temperature of more than or equal to 100° C. encompass: an imidazole derivative; an imidazole adduct; a compound in which an imidazole is subjected to clathration treatment with heterodimers; a microencapsulated imidazole or a microencapsulated imidazole derivative; and an imidazole adduct.

Examples of the imidazole derivative having a curing starting temperature of more than or equal to 100° C. encompass 2,4-diamino-6-[2'-methylimidazolyl-(1')]ethyl-s-triazine, 1-cyanoethyl-2-phenylimidazoliumtrimellitate, 2-phenyl-4,5-dihydroxymethylimidazole, and 2-phenyl-4-methyl-5-hydroxymethylimidazole. Among these imidazole derivatives, the imidazole compound having a triazine ring in a molecule is preferably because such an imidazole compound has high storage stability in the resin composition at room temperature and has a high curing speed. Examples of the imidazole compound encompass 2,4-diamino-6-[2'-methylimidazolyl-(1')]ethyl-s-triazine.

The imidazole curing agent acts as a curing agent of an epoxy resin, and is to be contained, in a resin composition, together with an amine curing agent such as dicyandiamide or a derivative thereof. This causes both of the curing agents to bring about curing promoting effects, and therefore makes it possible to cure the resin composition in a short period of time.

In view of storage stability of the resin composition and of a prepreg (described later) containing the resin composition, the imidazole curing agent preferably has low solubility in an epoxy resin at a temperature of less than or equal to 100° C. Therefore, the imidazole curing agent is preferably a crystalline solid at room temperature (25° C.). Meanwhile, for efficiently curing the epoxy resin, the volume average particle size of the imidazole curing agent is preferably less than or equal to 20 μm, more preferably less than or equal to 5 μm, and still more preferably less than or equal to 2 μm. An imidazole compound having a volume average particle size of less than or equal to 20 μm is preferable because such an imidazole compound is dispersed well in a thermosetting resin composition, so as to promote a curing reaction. Note that the volume average particle size of the imidazole curing agent can be measured by the identical method by which the volume average particle size of the amine curing agent is measured.

A mass ratio of the imidazole curing agent to the amine curing agent is preferably 1:0.3 to 1:3.5 in terms of [amine curing agent:imidazole curing agent]. Specifically, the imidazole curing agent is preferably contained in an amount 0.3 times to 3.5 times as much as the amount of the amine curing agent contained. If the ratio between the amine curing agent and the imidazole curing agent falls within this range, both of the amine curing agent and the imidazole curing agent bring about curing promoting effects, so that fast curability can be achieved. The ratio is more preferably 1:1 to 1:3.2, and still more preferably 1:1.2 to 1:3.

[Amount Ratio Between Epoxy Resin and Curing Agent]

The amine curing agent is contained in the resin composition in an amount of less than or equal to 3.8 parts by mass, relative to 100 parts by mass of the epoxy resin. If the amount of amine curing agent contained is less than or equal to 3.8 parts by mass, it is possible to impart excellent fast curability to the prepreg, and impart excellent mechanical strength to the cured product even with a short curing time. The amount of amine curing agent contained is preferably less than or equal to 3.5 parts by mass, more preferably less than or equal to 3.2 parts by mass, and still more preferably less than or equal to 3.0 parts by mass. In addition, the amine curing agent is preferably contained in an amount of more than or equal to 1 part by mass. This makes it possible to promote curing of the prepreg. The amount of amine curing agent contained is more preferably more than or equal to 1.5% by mass.

Furthermore, if the excessive amounts of the amine curing agent and the imidazole curing agent are contained in the resin composition, a fiber-reinforced composite material, which is a cured product of the prepreg, tends to have insufficient mechanical strength. For sufficiently increasing the mechanical strength, the amounts of the amine curing agent and the imidazole curing agent contained in the resin composition are less than or equal to 10 parts by mass, relative to 100 parts by mass of the epoxy resin. If the amounts are less than or equal to 10 parts by mass, good mechanical properties of the fiber-reinforced composite material can easily be achieved. From the above viewpoints, the amounts are more preferably more than or equal to 4 parts by mass, and still more preferably more than or equal to 5 parts by mass. The amounts are not limited, provided that the desired effect of increasing the mechanical strength can be obtained. For example, the amounts are preferably less than or equal to 9 parts by mass, more preferably less than or equal to 8 parts by mass, and can be less than or equal to 7.5 parts by mass. The amounts can be confirmed with use of, for example, known instrumental analysis.

[Other Additives]

Provided that the effect of the present embodiment is obtained, the resin composition can further contain other component(s) other than the epoxy resin, the amine curing agent, and the imidazole curing agent. The other components can be of a single kind or can be of two or more kinds. An amount of the other components to be contained can be determined as appropriate, provided that an effect of the other components and the effect of the present embodiment can be both obtained. Examples of the other components encompass: a stabilizer, a thermoplastic elastomer, elastomer fine particles, core-shell type elastomer fine particles, a diluent, inorganic particles such as a silica, carbonaceous components such as carbon nanotube and carbon black, flame retardants such as a phosphorus compound, an internal mold release agent containing a silicon compound or a fluorine compound, and a defoaming agent.

[Curing Completion Time of Resin Composition]

A curing completion time, in which curing of the resin composition is completed, is preferably less than or equal to 5 minutes, and more preferably less than or equal to 4.5 minutes at 140° C. If the curing is completed within these ranges, the resin composition can be considered to have sufficient fast curability as a resin composition for use in high-cycle press molding. The curing completion time within these ranges can be achieved by using the amine curing agent and the imidazole curing agent in combination. For example, the curing completion time can be further shortened (i.e. fast curability can be improved) according to the amounts and types of these curing agents.

The curing completion time can be measured with use of a curelastometer. A curelastometer is configured to (i) provide, to a resin composition, a sine wave oscillation having a constant amplitude in such a manner as to not destroy the resin composition at a constant temperature, (ii) continuously measure a torque transmitted from the resin composition to the upper dies, and (iii) record, as a torque amplitude/time curve (curing curve), changes in viscoelastic stress during progress in the curing reaction. The curing completion time of the resin composition is obtained by (i) obtaining, from the curve, a maximum torque value (Tmax) at which the torque value no longer changes and (ii) calculating a 90% torque value (T90) of the maximum torque value. Then, a period of time it took from the start of the measurement until the T90 was reached is measured, and is regarded as the curing completion time (t90).

[Method of Producing Resin Composition]

The resin composition can be produced by a conventionally well-known method of producing a thermosetting resin composition for use in a prepreg. The resin composition is preferably produced with use of a glass flask, a kneader, a planetary mixer, a typical stirring and heating pot, or a typical stirring and pressuring heating pot.

The resin composition is, for example, preferably produced by a production method including the following steps.

Step (1): The step of obtaining an epoxy resin main agent by placing, in a dissolution vessel, an epoxy resin and, as necessary, any additive such as a thermoplastic resin, and heating and mixing the resin and/or the additive at 70° C. to 150° C. for 1 hour to 6 hours.

Step (2): The step of obtaining a resin composition by cooling the epoxy resin main agent down to 40° C. to 70° C., adding a remaining epoxy resin, an amine curing agent, and an imidazole curing agent, and then mixing the resin and the agents at 40° C. to 70° C. for 0.5 hours to 2 hours.

In the step (2), the epoxy resin, the amine curing agent, and the imidazole curing agent can be added, to the epoxy resin main agent, separately or in a uniformly mixed manner (as a masterbatch). The masterbatch can be prepared by, for example, kneading the epoxy resin, the amine curing agent, and the imidazole curing agent at room temperature.

<Prepreg>

The prepreg in accordance with an embodiment of the present invention is a prepreg in a sheet form in which a reinforcing fiber material is impregnated with a resin composition.

(Reinforcing Fiber Material)

The reinforcing fiber material is a base material which is made of reinforcing fibers and which is to be used for a prepreg. Examples of the reinforcing fibers encompass inorganic fibers, organic fibers, metal fibers, and hybrid reinforcing fibers obtained by combining these fibers. The reinforcing fibers can be of a single kind or can be of two or more kinds.

Examples of the inorganic fibers encompass carbon fibers, graphite fibers, silicon carbide fibers, alumina fibers, tungsten carbide fibers, boron fibers, and glass fibers. Examples of the organic fibers encompass aramid fibers, high-density polyethylene fibers, other typical nylon fibers, and polyester fibers. Examples of the metal fibers encompass stainless steel fibers and iron fibers. Examples of the metal fibers also encompass carbon coated metal fibers obtained by coating metal fibers with carbon. Among these, carbon fibers are preferable in view of mechanical properties such as strength of a fiber-reinforced composite material caused by heat-curing of a prepreg.

The reinforcing fibers can be long fibers or short fibers, and are preferably long fibers because long fibers have excellent rigidity.

Examples of the reinforcing fiber material encompass: a UD sheet (unidirectional sheet) in which multiple long fibers are arranged in one direction; cloth (fabric) obtained by weaving long fibers; and a nonwoven fabric made of short fibers. Examples of a method of weaving the cloth encompass a plain weave, a twill weave, a satin weave, and a triaxial weave.

A weight per unit area of the reinforcing fiber material can be determined as appropriate according to desired characteristics of the fiber-reinforced composite material. If a prepreg is to be preformed so that the prepreg has a certain thickness as described earlier, causing the prepreg to have a large thickness, that is, causing the reinforcing fiber material (e.g. cloth) to have a large weight per unit area, makes it possible to reduce the number of layers in the prepreg. This allows the operation efficiency to be high. However, an excessively large weight per unit area of the cloth may cause the rigidity of the prepreg to be high, so that adaptation of the prepreg to the mold may be insufficient.

In view of operation efficiency and molding processability in the preform, the reinforcing fiber material has a weight per unit area of preferably 100 g/m² to 1000 g/m², more preferably 150 g/m² to 1000 g/m², and still more preferably 300 g/m² to 1000 g/m². The fiber weight per unit area of the reinforcing fiber material is preferably more than or equal to the lower limit of the ranges because, with such a fiber weight per unit area, the number of layers necessary for obtaining a molded product having a desired thickness is not large. The fiber weight per unit area of the reinforcing fiber material is preferably less than or equal to the upper limit of the range because, with such a fiber weight per unit area, it is easy to obtain a prepreg in a good impregnation state, so that drape properties are not excessively low.

If a complex shape is to be molded in high-cycle press molding, the cloth is preferably made of a reinforcing fiber material because such cloth makes preforming easy. A reinforcing fiber material, which is cloth, will also particularly be referred to as "reinforcing fiber cloth", and a prepreg containing the reinforcing fiber cloth will also be particularly referred to as "cloth prepreg".

(Impregnation of Reinforcing Fiber Material)

The prepreg is formed by impregnating a reinforcing fiber material with the epoxy resin composition. The reinforcing fiber material is impregnated with the resin composition by, for example, (i) coating a surface of release paper or the like with the resin composition in a certain amount, (ii) supplying the reinforcing fiber material onto the surface, and (iii) passing, through a pressure roll, the release paper on which the resin composition and the reinforcing fiber material are supplied. Alternatively, the reinforcing fiber material is impregnated with the resin composition by (i) directly coating the reinforcing fiber material with the resin composition in a certain amount and (ii) passing the reinforcing fiber material through a pressure roll while, as necessary, the reinforcing fiber material is sandwiched between pieces of release paper or the like.

In addition, a degree of impregnation to which the reinforcing fiber material is impregnated with the resin composition is represented by a ratio of the resin composition content to the reinforcing fiber material of the prepreg. The degree of impregnation can be obtained by a method of observing, with use of a microscope, a cross section of the prepreg, which cross section is perpendicular to a fiber direction. The degree of impregnation can be calculated from (i) a tow area of the reinforcing fiber material and (ii) an area of a non-impregnated part. For achieving sufficient and uniform mechanical strength of the fiber-reinforced composite material, the degree of impregnation is preferably more than or equal to 98%, and more preferably more than or equal to 99%. The degree of impregnation can be determined as appropriate, provided that the desired characteristics of the fiber-reinforced composite material can be obtained. For example, the degree of impregnation can be less than or equal to 99.8%. The amount of resin composition contained in the fiber-reinforced composite material can also be evaluated as a resin content which is a ratio of the amount of contained resin composition to the amount of prepreg.

(Lamination of Prepregs) The prepreg is used as a single layer or, as necessary, as a laminate in which a plurality of layers are laminated.

A lamination structure of the prepreg is not limited to any particular one. For example, in a case where UD prepregs are to be used, the UD prepregs are laminated so that fiber axes of reinforcing fibers of vertically adjacent UD prepregs are orthogonal to each other. Only prepregs of an identical type can be laminated, or prepregs of different types can be laminated.

The number of prepregs to be laminated is not particularly limited, and can be determined as appropriate according to characteristics or the like of a demanded fiber-reinforced composite material. The laminate of the prepregs can be prepared by impregnating the laminate of the reinforcing fiber materials with the resin composition, or can be prepared by laminating the prepregs.

A value in a test on drape properties of the prepreg (hereinafter also referred to as "draping value") is preferably 20° to 70°. The draping value is an index for evaluating a balance between rigidity of a prepreg (i.e. how difficult it is for the prepreg to be deformed) and following properties of the prepreg with respect to a mold (i.e. how easy it is for the prepreg to be deformed). The draping value indicates a degree to which, when one end of a horizontally support prepreg is fixed as a fixed end and the other end is left as a free end, the other end sags.

The draping value can be obtained by, for example, the following method. First, a test piece of a prepreg having a length of 200 mm and a width of 15 mm is prepared. If the reinforcing fiber material is a unidirectional material, the length of the test piece is a length in a direction in which the reinforcing fiber extends. If the reinforcing fiber material is cloth, the length of the test piece is a length in a warp direction of the reinforcing fiber material. If the reinforcing fiber material is a unidirectional material, the width of the test piece is a length in a direction orthogonal to a direction in which the reinforcing fiber extends. If the reinforcing fiber material is cloth, the length of the test piece is a weft direction of the reinforcing fiber material.

Then, the test piece is set on a test stand so that (i) up to a portion 50 mm away from one end of the test piece is placed on a horizontal top surface of the test stand and (ii) the rest of the test piece protrudes from the test stand. Then, the test piece is left to stand at normal temperature (23° C.) for 3 minutes. An angle with which a portion on the free end side of the test piece is a horizontal plane is obtained, and is regarded as the draping value. The angle is an angle on the free end side, of angles between (i) a straight line connecting the other end of the portion of the test piece on the test stand to the free end of the test piece and (ii) the horizontal plane.

An excessively small draping value may result in insufficient following properties of the prepreg with respect to the mold, and an excessively large draping value may cause the prepreg to be excessively soft, so as to be difficult to handle. In view of the preforming properties and handleability of the prepreg, the draping value is preferably more than or equal to 20°, more preferably more than or equal to 25°, and still more preferably more than or equal to 30°. In addition, for achieving sufficient following properties, the draping value is preferably less than or equal to 70°, more preferably less than or equal to 65°, and still more preferably 60°. The draping value can be adjusted by, for example, rigidity or the weight per unit area of the reinforcing fiber material.

The prepreg can further contain constituent elements other than the reinforcing fiber material and the resin composition, provided that the effects of the present embodiment can be obtained. Examples of such a constituent element encompass: a laminate in which a nonwoven fabric having a weight per unit area of 5 g/m² to 50 g/m² is laminated on the surface of the prepreg and (ii) a laminate in which a sheet impregnated with a resin composition is laminated on a nonwoven fabric having a weight per unit area of 5 g/m² to 50 g/m².

By curing the prepreg through heating and pressurization, a fiber-reinforced composite material is formed. The fiber-reinforced composite material will be described below.

<Fiber-Reinforced Composite Material>

The fiber-reinforced composite material in accordance with an embodiment of the present invention is a cured product of the prepreg, which cured product is obtained by a curing reaction of the resin composition.

The fact that the fiber-reinforced composite material in accordance with the present embodiment is a cured product of the prepreg in accordance with the present embodiment can be confirmed by results of known instrumental analysis. For example, the amount of amine curing agent contained in the resin composition of the prepreg can be presumed on the basis of (i) an amine curing agent contained in the fiber-reinforced composite material, (ii) the amount of residue of the amine curing agent, and (iii) the ratio of a crosslinked structure resulting from the amine curing agent. Likewise, the amount of imidazole curing agent contained in the resin composition of the prepreg can be presumed on the basis of (i) an imidazole curing agent contained in the fiber-reinforced composite material, (ii) the amount of residue of the imidazole curing agent, and (iii) the ratio of a crosslinked structure resulting from the imidazole curing agent. Based on these presumed amounts of the amount of amine curing agent and the imidazole curing agent contained, it is possible to confirm that the fiber-reinforced composite material in accordance with the present embodiment is a cured product of the prepreg in accordance with the present embodiment.

The fiber-reinforced composite material is produced by subjecting the prepreg to heating and pressurization. For example, the fiber-reinforced composite material can be produced by a production method including the step of placing the prepreg or a preform into a mold and subjecting the prepreg or the preform to heating and pressurization. The production method can further include the steps of (i) forming a prepreg laminate by laminating prepregs in the mold and (ii) preforming the prepreg laminate compressing the prepreg laminate with use of a mold (to form a preform).

[Molding (Curing) Step]

The prepreg laminate obtained by laminating a necessary number of prepregs is subjected to heating and pressurization with use of a mold, so that a fiber-reinforced composite material is obtained.

A known molding method can be used as a method of molding the prepreg laminate with use of a mold. Examples of the known method encompass autoclave molding, oven molding, internal-pressure molding, and press molding.

With press molding, in comparison with other molding methods, it is easier to obtain a fiber-reinforced composite material having, on a surface layer, a resin layer formed by a resin film. However, press molding tends to cause molding pressure to be high, so as to cause a resin to flow out of the mold. However, the resin composition described earlier has excellent fast curability, and can therefore prevent the resin from flowing out of the mold during molding. Hence, the resin composition described earlier is more effective when press molding is employed in a molding step in an aspect of the present invention, and the resin composition described earlier is particularly effective when high-cycle press molding is employed in a molding step in an aspect of the present invention.

The following description will discuss an example of FIG. 1 in which, with use of a mold 100, a prepreg laminate 1 is subjected to press molding so as to prepare a fiber-reinforced composite material 2. The mold 100 includes (i) a lower mold 110 having a protrusion 112 provided on a top surface side thereof and (ii) an upper mold 120 having a recess 122 provided on a bottom surface side thereof. When the mold 100 is closed by bringing the upper mold 120 in proximity to the lower mold 110, a cavity is formed between the protrusion 112 and the recess 122 in the mold 100 so as to have a shape complementary to the shape of a target fiber-reinforced composite material.

Figure 2:
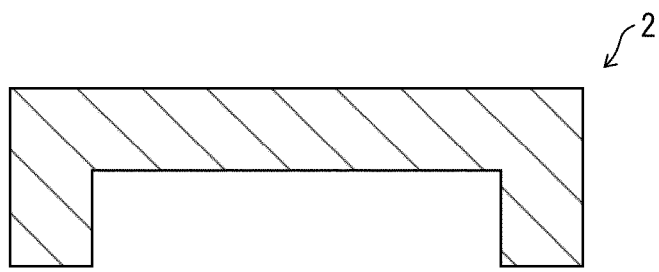
FIG. 2 is a view illustrating a fiber-reinforced composite material produced by a production method illustrated in FIG. 1.

After the prepreg laminate 1 is provided on the lower mold 110 as illustrated in (a) of FIG. 1, the mold 100 is closed by bringing the lower mold 110 in proximity to the upper mold 120 as illustrated in (b) of FIG. 1. Then, the prepreg laminate 1 is subjected to heating and pressurization so as to be molded. Because the prepreg laminate 1 is heated while being pressured by the mold 100, a resin composition in the prepreg laminate 1 is cured while flowing. After the curing, the mold 100 is opened and the fiber-reinforced composite material 2 is taken out as illustrated in (c) of FIG. 1, so that the fiber-reinforced composite material as illustrated in FIG. 2 is obtained.

As molding conditions, any publicly known molding condition can be employed in addition to the use of the prepreg laminate 1.

A temperature of the mold during the molding is preferably 100° C. to 180° C., and more preferably 120° C. to 160° C. Performing the heating at a temperature more than or equal to the lower limit of the range, it is possible to quickly cure the resin composition. This makes it possible to shorten a molding cycle. Performing the heating at a temperature less than or equal to the upper limit of the range, it is possible to prevent the resin flow during the molding. This makes it possible to obtain a molded product having a good appearance.

A contact pressure during the molding is preferably 1 MPa to 15 MPa, and more preferably 4 MPa to 10 MPa. By applying a pressure of more than or equal to the lower limit of the range, it is possible to cause the resin to easily flow, so that the resin composition is distributed throughout the mold. This makes it possible to easily obtain a molded product having a good appearance. By applying a pressure of less than or equal to the upper limit, it is possible to prevent the resin from excessively flowing. This prevents a poor appearance.

A molding time is preferably 1 minute to 15 minutes, more preferably 2 minutes to 8 minutes, and still more preferably 2 minutes to 5 minutes. Performing the molding for a period more than or equal to the lower limit of the range, it is possible to prepare a resin composition having excellent storage stability and excellent fast curability. By performing the molding for a period less than or equal to the upper limit, it is possible to perform high-cycle press molding.

[Preforming Step]

The method of producing the fiber-reinforced composite material can further include, before the molding step, a preforming step of preforming the prepreg laminate obtained in the laminating step, so as to obtain a preform. Specifically, the method of producing the fiber-reinforced composite material can be a method in which the laminating step, the preforming step, and the molding step are carried out this order. In such a case, the prepreg laminate obtained in the laminating step is formed, in the preforming step, into a preform having a shape substantially identical to the desired shape of a molded product. Then, in the molding step, the preform is subjected to heating and pressurization so as to be molded into a desired shape of the molded product. This produces a fiber-reinforced composite material. The number of layers laminated in the prepreg laminate to be subjected to the preforming step can be selected as appropriate according to a demanded thickness of a molded product.

A method of preforming the prepreg laminate need only be a method in which the prepreg laminate can be preformed into an intermediate shape in view of the shape of a target fiber-reinforced composite material. Any known method can be employed, provided that the prepreg laminate in accordance with an embodiment of the present invention is used.

Strength of the fiber-reinforced composite material can be determined as appropriate according to desired purpose of the fiber-reinforced composite material. For example, the fiber-reinforced composite material is to be used for an automobile part, 90°-bending strength of the fiber-reinforced composite material is preferably more than or equal to 80 MPa, more preferably more than or equal to 100 MPa, and still more preferably more than or equal to 110 MPa.

The prepreg in accordance with an embodiment of the present invention contains: a reinforcing fiber material; and a resin composition with which the reinforcing fiber material is impregnated. The resin composition contains an epoxy resin, an amine curing agent, and an imidazole curing agent. An amount of the amine curing agent is less than or equal to 3.8 parts by mass, relative to 100 parts by mass of the epoxy resin. A sum of the amount of the amine curing agent and an amount of the imidazole curing agent is less than or equal to 10 parts by mass, relative to 100 parts by mass of the epoxy resin.

With the configuration above, it is possible to achieve a prepreg with which fast curability in high-cycle press molding and good mechanical properties are both possible.

For sufficiently increasing fast curability of the prepreg, it is more effective to arrange the prepreg so that the amount of the imidazole curing agent is 0.3 times to 3.5 times as much in terms of a mass ratio as the amount of the amine curing agent.

For sufficiently increasing mechanical strength of a fiber-reinforced composite material which is a cured product of the prepreg, it is even more effective to arrange the prepreg so that: the epoxy resin contains an oxazolidone ring-containing epoxy resin which contains an oxazolidone ring in a molecule; and an amount of the oxazolidone ring-containing epoxy resin is more than or equal to 25 parts by mass, relative to 100 parts by mass of the epoxy resin.

For sufficiently increasing fast curability of the prepreg, it is even more effective to arrange the prepreg so that the epoxy resin has an epoxy equivalent of more than or equal to 200 g/eq.

For increasing storage stability of the resin composition and mechanical properties of the resin cured product, it is even more effective to arrange the prepreg so that the amine curing agent is dicyandiamide.

For increasing storage stability of the curing agent at room temperature in the resin composition and for increasing the curing speed of the resin composition, it is even more effective to arrange the prepreg so that the imidazole curing agent is an imidazole compound having a triazine ring in a molecule.

According to the prepreg in accordance with an embodiment of the present invention, a curing completion time of the resin composition measured with use of a curelastometer is less than or equal to 5 minutes at 140° C.

With the configuration above, it is possible to achieve a prepreg which has not only fast curability and good mechanical properties but also excellent preforming properties even with use of cloth having a large weight per unit area.

The prepreg can be arranged so that: the reinforcing fiber material has a weight per unit area of 100 g/m² to 1000 g/m²; the reinforcing fiber material is impregnated with the resin composition to a degree of impregnation of more than or equal to 98%; and the prepreg yields a value of 20° to 70° in a test on drape properties.

The configuration above is even more effective for (i) making it easy to adjust the thickness of a prepreg laminate, (ii) achieving sufficient mechanical characteristics by curing of the resin composition, and (iii) achieving good preforming properties of the prepreg.

In view of operation efficiency and molding processability of a preform, it is more effective to arrange the prepreg so that: the reinforcing fiber material is reinforcing fiber cloth; and the reinforcing fiber cloth has a weight per unit area of 150 g/m² to 1000 g/m².

In addition, in view of operation efficiency and molding processability of a preform, it is even more effective to arrange the prepreg so that the reinforcing fiber cloth has a weight per unit area of 300 g/m² to 1000 g/m².

A fiber-reinforced composite material, which is a cured product of the prepreg in accordance with an embodiment of the present invention, has excellent mechanical properties.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss the present invention in detail below by Examples. However, the present invention is not limited to the following description.

[Raw Materials Used]

The raw materials used in Examples are shown below.

(Epoxy Resin)

jER828: A bisphenol A epoxy resin (product name: "jER 828"; epoxy equivalent: 189; manufactured by Mitsubishi Chemical Corporation)

TSR-400: An epoxy resin containing an oxazolidone ring (product name: "TSR-400"; epoxy equivalent: 339; manufactured by DIC Corporation).

N740: A phenol novolac type epoxy resin (product name: "N740"; epoxy equivalent: 182; manufactured by DIC Corporation)

N775: A phenol novolac type epoxy resin (product name: "N775"; epoxy equivalent: 189; manufactured by DIC Corporation)

(Amine Curing Agent)

1400F: Dicyandiamide (product name "Dicyanex 1400F"; manufactured by Air Products Ltd.; average particle size: 4.5 μm)

(Imidazole Curing Agent)

2MZA-PW: 2,4-diamino-6-(2'-methylimidazolyl-(1'))-ethyl-s-triazine (volume average particle size: 1.4 μm; product name: "CUREZOL 2MZA-PW"; manufactured by Shikoku Chemicals Corporation)

(Reinforcing Fiber)

Carbon fiber bundle: product name "TRW40 50L"; manufactured by Mitsubishi Chemical Corporation; tensile strength: 4.1 GPa; tensile elastic modulus: 240 GPa; the number of filament: 50,000; weight per unit area: 3.75 g/m$^2$ (Preparation of Masterbatch)

Components were kneaded at mass ratios shown in Table 1 below. Then, with use of a three-roll mill, the components were uniformly dispersed, so that masterbatches I-1 to I-6 and II-1 were prepared. The numerical values in Table 1 indicate those of parts by mass.

TABLE 1

| Masterbatch | I-1 | I-2 | I-3 | I-4 | I-5 | I-6 | II-1 |
|---|---|---|---|---|---|---|---|
| jER828 | 10.0 | 10.0 | 10.0 | 10.0 | 10.0 | 10.0 | 10.0 |
| 1400F | 2.0 | 2.0 | 3.0 | 1.0 | 2.5 | 3.0 | 5.0 |
| 2MZA-PW | 4.0 | 5.0 | 3.0 | 4.0 | 5.0 | 6.0 | 3.5 |

Example 1

22.5 parts by mass of jER828, 42.5 parts by mass of TSR400, and 25.0 parts by mass of N740 were introduced into a dissolution vessel, and were dissolved at 80° C. Then, a resultant product was cooled to 60° C. Then, 16 parts by mass of masterbatch I-1 was added, and a resultant product was further stirred and mixed at 60° C. This produced a resin composition (C-1).

The resin composition (C-1) thus obtained was applied onto a release paper at 50° C. with use of Multicoater (manufactured by HIRANO TECSEED Co., Ltd.; Model: M-500), so that a resin film C-1 was obtained. With use of a drum winder, a carbon fiber bundle was wound on the surface of the resin film C-1 onto which the resin was applied, and then the carbon fiber bundle was sandwiched by the resin film C-1, so as to impregnate the carbon fiber bundle with the resin composition (C-1). This produced a unidirectional prepreg C-1. In the unidirectional prepreg C-1, the weight per unit area of the carbon fiber bundle is 250 g/m$^2$, and a resin content was 30.0% by mass. In addition, the degree of impregnation of the resin composition (C-1) in the unidirectional prepreg C-1 was 100%. The unidirectional prepreg C-1 was cut into pieces each having dimensions of 298 mm (in a direction parallel to the fibers)× 298 mm (in a direction orthogonal to the fibers). 10 of those pieces were laminated so as to have equal fiber directions. This produced a prepreg laminate C-1.

Press molding was performed for 5 minutes under the conditions that (i) the contact pressure applied to the prepreg laminate C-1 was 4 MPa and (ii) the mold temperature was 140° C. Then, burrs were removed from a resultant molded product. This produced a flat plate-like fiber-reinforced composite material C-1.

Examples 2 to 7

Resin compositions (C-2) to (C-7) were prepared as in Example 1 except that the compositions of the components and the resin contents were changed as shown in Table 2. In addition, prepreg laminated bodies C-2 to C-7 were produced as in Example 1 except that the resin composition (C-1) was replaced with the resin compositions (C-2) to (C-7), respectively. Then, fiber-reinforced composite materials C-2 to C-7 were produced as in Example 1 except that the prepreg laminate C-1 was replaced with the prepreg laminated bodies C-2 to C-7, respectively.

Comparative Example 1

A resin composition (X-1) was prepared as in Example 1 except that the compositions of the components and the resin contents were changed as shown in Table 2. Then, a prepreg laminate X-1 was produced as in Example 1 except that the resin composition (C-1) was replaced with the resin composition (X-1). A fiber-reinforced composite material X-1 was produced as in Example 1 except that the prepreg laminate C-1 was replaced with the prepreg laminate X-1.

EVALUATION (1) Curing Completion Time (t90)

For each of the resin compositions (C-1) to (C-7) and (X-1) obtained, a curing completion time t90 of the resin composition was obtained by the following method. The curing completion time of a resin composition is a period of time it takes to reach a 90% torque value of a maximum torque value.

First, with use of "CURELASTOMETER (registered trademark) 7 Type P" manufactured by JSR Trading Co., Ltd., changes in torque value (N·m) at a die temperature of 140° C. were measured. Then, from the curve, a maximum torque value (Tmax) at which the torque value no longer changes was obtained, and a 90% torque value (T90) of the maximum torque value was calculated. Then, a period of time it took from the start of the measurement until the T90 was reached was measured, and was regarded as the curing completion time (t90) of the curelastometer. When the curing completion time was less than or equal to 10 minutes, the resin composition can be evaluated as having practicable fast curability. When the curing completion time was less than or equal to 5 minutes, the resin composition was evaluated as having fast curability that is suitable for high-cycle press molding. The measurement conditions are as follows.

Device: CURELASTOMETER (manufactured by JSR Trading Co., Ltd.; "CURELASTOMETER 7 Type P")

Die effective bore diameter: ϕ 160 mm

Measurement temperature: 140° C.

(2) 90°-Bending Test on Fiber-Reinforced Composite Material

With use of a wet-type diamond cutter, the fiber-reinforced composite material C-1 obtained was cut into a piece having dimensions of a length (in a direction orthogonal to the fibers) of 63 mm and a width (in a direction parallel to the fibers) of 12.7 mm. Then, an end surface of the piece was polished with use of a #1000 sandpaper. This prepared a test piece C-1.

A 90°-bending strength (FS90) of the test piece C-1 was calculated through performing a three-point bending test with use of a universal testing machine (Instron (registered trademark) 4465 manufactured by Instron; analysis software: Bluehill) under the following conditions in conformity with ASTM D790: (i) indenter R: 5.0; (ii) L/D: 16; and (iii) crosshead speed: 0.92 mm/min. to 0.94 mm/min. When the 90°-bending strength is more than or equal to 40 MPa, the fiber-reinforced composite material can be evaluated as having useful 90°-bending strength. When the 90°-bending strength is more than or equal to 90 MPa, it can be determined that the resin composition poses no problem in practicing high-cycle press molding.

Test pieces C-2 to C-7 and X-1 were prepared as with the test piece C-1 except that the resin composition was replaced with the resin compositions (C-2) to (C-7) and (X-1), and respective values of 90°-bending strength (FS90) were obtained. It should be noted that in the case of the test piece X-1, the prepreg was not cured under the above conditions, and was therefore not formed into a test piece. Hence, the 90°-bending strength was not measured.

Table 2 shows the compositions and curing completion times of the resin compositions and results of the 90°-bending test on the fiber-reinforced composite materials. In Table 2, "$R_{T/A}$" indicates a mass ratio of the imidazole curing agent to the amine curing agent in the resin composition, and "Rc" indicates the total parts by mass of the imidazole curing agent and the amine curing agent in the resin composition. In addition, "Ee" indicates the epoxy equivalent of the epoxy resin in the resin composition, "t90" indicates the curing completion time of the curelastometer, and "FS90" indicates the 90°-bending strength.

TABLE 2

|  |  | Example 1 | Example 2 | Example 3 | Example 4 | Example 5 | Example 6 | Example 7 | Comparative Example 1 |
|---|---|---|---|---|---|---|---|---|---|
| Epoxy resin | jER828 | 22.5 | 10.0 | 22.5 | 22.5 | 10.0 | 30.0 | 32.5 | 22.5 |
|  | TSR400 | 42.5 | 45.0 | 42.5 | 42.5 | — | 20.0 | 42.5 | 42.5 |
|  | N740 | 25.0 | 35.0 | 25.0 | 25.0 | 35.0 | — | — | 25.0 |
|  | N775 | — | — | — | — | 45.0 | 40.0 | 25.0 | — |
| Masterbatch | I-1 | 16.0 | — | — | — | — | — | — | — |
|  | I-2 | — | 17.0 | — | — | — | — | — | — |
|  | I-3 | — | — | 16.0 | — | — | — | — | — |
|  | I-4 | — | — | — | 15.0 | — | — | — | — |
|  | I-5 | — | — | — | — | 17.5 | 17.5 | — | — |
|  | I-6 | — | — | — | — | — | — | 19.0 | — |
|  | II-1 | — | — | — | — | — | — | — | 18.5 |
| Amine curing agent (parts by mass) |  | 2.0 | 2.0 | 3.0 | 1.0 | 2.5 | 2.5 | 3.0 | 5.0 |
| $R_{T/A}$ (—) |  | 2.0 | 2.5 | 1.0 | 4.0 | 2.0 | 2.0 | 2.0 | 0.7 |
| Rc (—) |  | 6.0 | 7.0 | 6.0 | 5.0 | 7.5 | 7.5 | 9.0 | 8.5 |
| Ee (g/eq) |  | 230 | 232 | 230 | 230 | 186 | 207 | 230 | 230 |
| t90 (minutes) |  | 4.26 | 3.02 | 5.64 | 7.08 | 5.73 | 2.78 | 2.96 | 5.63 |
| FS90 (MPa) |  | 111 | 125 | 61 | 52 | 46 | 42 | 101 | Not measurable |

As shown in Table 2, the resin compositions (C-1) to (C-7) of Examples 1 to 7 each had practicable fast curability. In addition, the fiber-reinforced composite materials formed from the prepregs with use of the resin compositions (C-1) to (C-7) of Examples 1 to 7 each had useful 90°-bending strength.

In the case of the resin composition (X-1) of Comparative Example 1, the amount of the amine curing agent relative to 100 parts by mass of the epoxy resin did not reach a value less than or equal to 3.8 parts by mass. Hence, the prepreg was not sufficiently cured under the evaluation conditions, and it was therefore not possible to evaluate the 90°-bending strength.

Example 8

The resin film of the resin composition (C-1) obtained in Example 1 was affixed to both surfaces of TRK510M (manufactured by Mitsubishi Chemical Corporation; weight per unit area: 646 g/m$^2$) which is cloth of a carbon fiber. By impregnating the carbon fiber cloth with the resin composition (C-1), a cloth prepreg was obtained. The resin content of this cloth prepreg was 39.5% by mass. In addition, the degree of impregnation of the resin composition (C-1) in the cloth prepreg was 100%. The cloth prepreg thus obtained was subjected to a test on drape properties by the following method.

[Test on Drape Properties of Prepreg]

Figure 3:
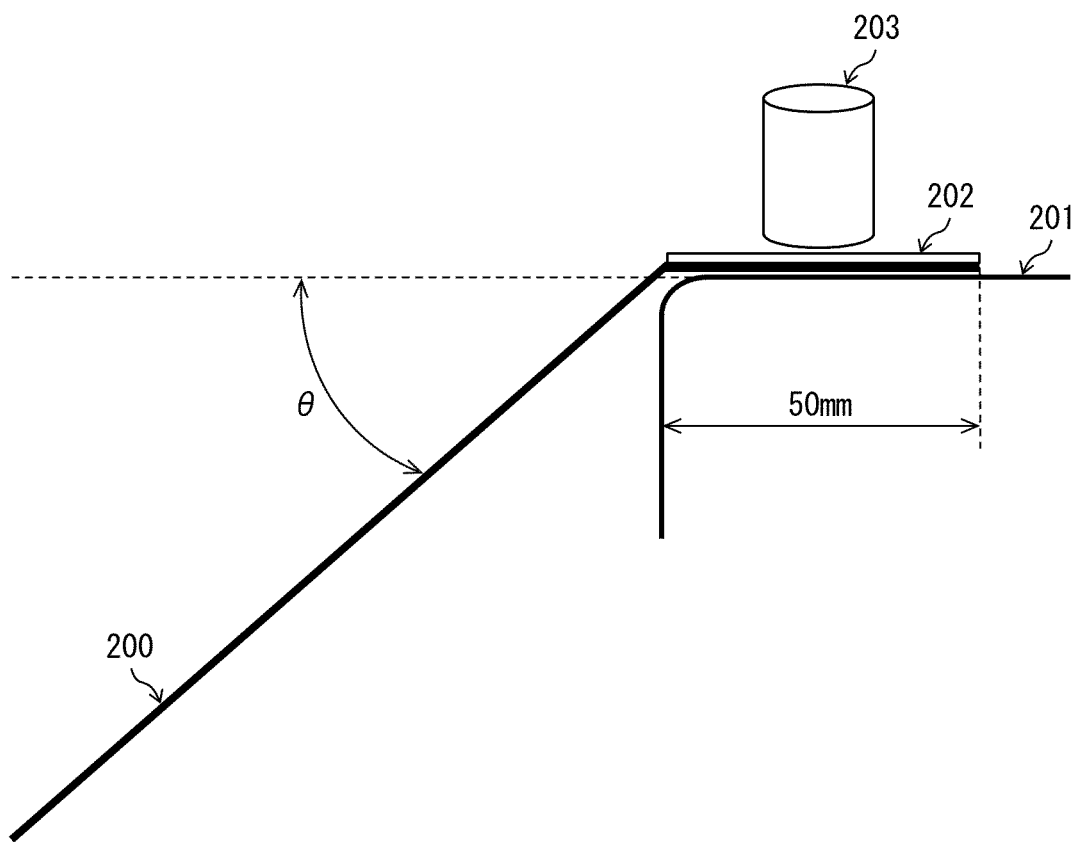
FIG. 3 is a view for describing a test on drape properties of a prepreg in accordance with an embodiment of the present invention.

FIG. 3 is a view for describing the test on drape properties of the cloth prepreg. The cloth prepreg was cut into pieces each having a length of 200 mm and a width of 15 mm. Three of such pieces were prepared. The length extends in the warping direction of the cloth, and the width extends in the weft direction of the cloth.

As illustrated in FIG. 3, a test piece 200 was set on a test stand 201 so that (i) up to a portion 50 mm away from one end of the test piece 200 lengthwise was placed on a horizontal top surface of the test stand 201 and (ii) the rest of the test piece 200 protrudes from the test stand 201. An aluminum plate 202 of 50 mm×50 mm was placed on an upper portion of the test stand 201. Then, a weight 203 having a weight of 200 g was placed on the aluminum plate 202 so as to fix the test piece 200.

The test piece 200 was held horizontally. Then, the test piece 200 was released, and was left to stand at normal temperature (23'C) for 3 minutes. Then, an angle θ between the test stand 200 and a portion of the test piece 200 on the sagging free end side was measured. By identical operation, measurements were performed three times for respective test pieces. Then, an average value of the measurements was regarded as a draping value of the cloth prepreg. When the draping value is 20° to 70°, it can be determined that the drape properties of the prepreg pose no problem in actual use.

The drape properties of the cloth prepreg were measured, and were found to be 27.2°. This shows that the cloth prepreg has high drape properties, and therefore possesses good preforming properties.

INDUSTRIAL APPLICABILITY

The present invention can be applied to various purposes. In particular, the present invention is useful for general industrial purposes, especially as a material for automobiles.

REFERENCE SIGNS LIST

1 Prepreg laminate
2 Fiber-reinforced composite material

100 Mold
110 Lower mold
112 Protrusion
120 Upper mold
122 Recess
200 Test piece
201 Test stand
202 Aluminum plate
203 Weight

The invention claimed is:

1. A prepreg, comprising:
a reinforcing fiber material; and
an epoxy resin composition with which the reinforcing fiber material is impregnated, the epoxy resin composition comprising
an epoxy resin component comprising a bisphenol A epoxy resin, a phenol novolac type epoxy resin, and an oxazolidone ring-containing epoxy resin which comprises an oxazolidone ring in a molecule,
an amine curing agent, and
an imidazole curing agent,
wherein a content of the amine curing agent in the epoxy resin composition is in a range of from 1 to 3.8 parts by mass, relative to 100 parts by mass of the epoxy resin component,
wherein a sum of the content of the amine curing agent and a content of the imidazole curing agent in the epoxy resin composition is in a range of from 5 to 10 parts by mass, each relative to 100 parts by mass of the epoxy resin component, and
wherein a content of the oxazolidone ring-containing epoxy resin in the epoxy resin composition is greater than or equal to 25 parts by mass, relative to 100 parts by mass of the epoxy resin component.

2. The prepreg of claim 1, wherein the content of the imidazole curing agent is in a range of from 1 time to 3.5 times as much in terms of a mass ratio as the content of the amine curing agent in the epoxy resin composition.

3. The prepreg of claim 1, wherein a content of the oxazolidone ring-containing epoxy resin in the epoxy resin composition is greater than 25 parts by mass, relative to 100 parts by mass of the epoxy resin component.

4. The prepreg of claim 1, wherein the epoxy resin component has an epoxy equivalent of greater than or equal to 200 g/eq in the epoxy resin composition.

5. The prepreg of claim 1, wherein the amine curing agent comprises dicyandiamide.

6. The prepreg of claim 1, wherein the imidazole curing agent comprises an imidazole compound comprising a triazine ring in a molecule.

7. The prepreg of claim 6, wherein the imidazole compound comprises 2,4-diamino-6-[2'-methylimidazolyl-(1')]-ethyl-s-triazine.

8. The prepreg of claim 1, wherein a curing completion time of the epoxy resin composition, measured with a curelastometer, is less than or equal to 5 minutes at 140° C.

9. The prepreg of claim 1, wherein the reinforcing fiber material has a weight per unit area in a range of from 100 g/m² to 1000 g/m².

10. The prepreg of claim 9 wherein:
the reinforcing fiber material is impregnated with the epoxy resin composition in the prepreg to a degree of impregnation of greater than or equal to 98%; and
the prepreg yields a value in a range of from 20° to 70° in a test on drape properties.

11. The prepreg of claim 9, wherein the reinforcing fiber material has a weight per unit area in a range of from 150 g/m² to 1000 g/m².

12. The prepreg of claim 11, wherein the reinforcing fiber material has a weight per unit area in a range of from 300 g/m² to 1000 g/m².

13. The prepreg of claim 1, which is a cloth prepreg.

14. A fiber-reinforced composite material, which is a cured product of the prepreg of claim 1.

15. A method of producing a fiber-reinforced composite material, comprising:
curing the prepreg of claim 1.

16. The prepreg of claim 1, wherein the content of the oxazolidone ring-containing epoxy resin in the epoxy resin composition is in a range of from 32 to 70 parts by mass, relative to 100 parts by mass of the epoxy resin component.

17. The prepreg of claim 16, wherein the content of the oxazolidone ring-containing epoxy resin in the epoxy resin composition is in a range of from 42.5 to 70 parts by mass, relative to 100 parts by mass of the epoxy resin component.

18. The prepreg of claim 17, wherein the epoxy resin component has an epoxy equivalent of greater than or equal to 200 g/eq in the epoxy resin composition.

19. The prepreg of claim 18, wherein the amine curing agent comprises dicyandiamide.

* * * * *